H. Z. COBB.
PACKING CUP FOR PUMPS.
APPLICATION FILED JAN. 17, 1913.

1,122,574.

Patented Dec. 29, 1914.

WITNESSES
Edw. W. Vaill
J. B. Vanderbilt

INVENTOR:
Henry Z. Cobb
By his Attorney
Ernest Hopkinson

UNITED STATES PATENT OFFICE.

HENRY Z. COBB, OF WINCHESTER, MASSACHUSETTS, ASSIGNOR TO REVERE RUBBER COMPANY, OF PROVIDENCE, RHODE ISLAND, A CORPORATION OF RHODE ISLAND.

PACKING-CUP FOR PUMPS.

1,122,574.  Specification of Letters Patent.  Patented Dec. 29, 1914.

Application filed January 17, 1913. Serial No. 742,534.

*To all whom it may concern:*

Be it known that I, HENRY Z. COBB, a citizen of the United States, residing in the city of Winchester, county of Middlesex, and State of Massachusetts, have invented certain new and useful Improvements in Packing-Cups for Pumps, of which the following is a full, clear, and complete disclosure.

My invention relates particularly to packing used for pumps which are employed in pumping crude oil from considerable depths, and which are required to stand the strain due to weight of the oil in the pumping tube at the various depths. This requires a very rigid and strong cup and one that will withstand the wear due to high pressures on the sides thereof and which will not fray or become rough at the wearing points.

Briefly, my invention comprises a braided fabric in the form of a tube which is doubled upon itself to give a selvage edge, the doubled portions being stitched together and the whole impregnated with rubber or similar compound for the purpose of making the same homogeneous.

Figure 1:
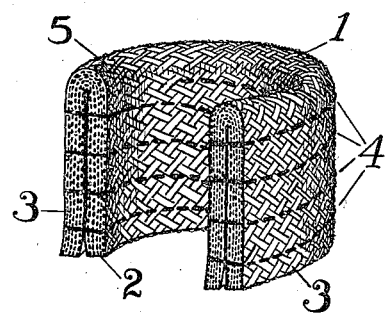
Figure 2:
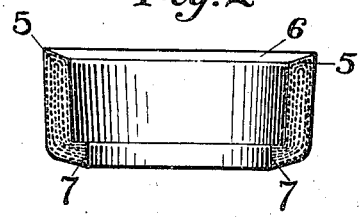
Figure 3:
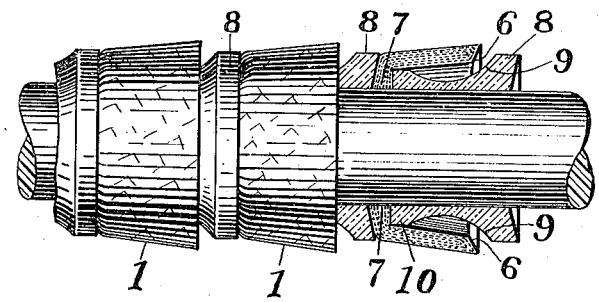

For a detailed description of one form of my invention, reference may be had to the following specification and to the accompanying drawing forming a part thereof, in which:

Figure 1 is a perspective view of one of the fabric rings for the packing cups, showing a portion thereof cut away to indicate the internal arrangement; Fig. 2 is a transverse sectional view, showing a complete cup; and Fig. 3 is a side view of a number of packing cups in position on the pump rod, and showing one of the said cups in cross section.

Referring to the drawing, the numeral 1 indicates the braided fabric for the packing cup which is braided, in the first instance, in the form of a cylindrical tube. This is then turned upon itself, forming the two parallel sides 2 and 3 which are stitched together by the spiral stitching 4, so as to make a braided or selvage edge 5 at one end of the ring thus formed. The cup is then molded after being impregnated with a suitable compound for making the cup homogeneous and flexible, but quite hard and solid in its general character as a whole. The molding produces a beveled edge 6 at the outer edge of the cup, at which point is located the selvage or braided edge 5 of the fabric. The opposite end of the fabric is turned inward during the molding process so that the cut or free ends of the fabric extend radially and abut against the packing rod, as indicated at 7 in Figs. 2 and 3. The cups are mounted upon a rod having the spacing collars 8 which are provided with inclined surfaces 9 and a reduced inner end 10 which engages the internal flange 7 of the packing cups. These collars are tightly forced together so as to hold the said flanged ends of the cup firmly in position, but the edges of the cup being slightly flexible allow the same to expand to sufficiently engage the bearing surfaces of the pumping tube.

It should be noted that there is a slight space between the outside surfaces of the spacing collars 8 and the inside surfaces of the packing cups. This provides a recess into which the liquid may enter and expand the cups into good working contact with the pump tube or casing. It also obviates dirt being retained on the working surfaces of the packing cup.

The advantageous features of the packing cup thus formed are that it eliminates all possibility of the cup opening or breaking at its sides and edges, which breaking would, of course, destroy the action of the cup, as sometimes occurs in a case where similar cups are made of wrapped, woven fabric. The method of doubling the fabric tube upon itself does away with the ragged edge at the working end of the cup, which is always present when the cup is made of the wrapped, woven fabric. The wrapped construction also allows the different plies of the fabric to separate. This is entirely prevented in applicant's construction. The fact that the cup is made of braided fabric allows the threads of the fabric to extend on a bias or at an angle, and thereby enables the cup to retain its full strength and flexibility at all times, without undue strain on the threads, which would occur in the wrapped construction where the warp and filler run parallel with the axis and circumferentially around the cup.

It is obvious that my improved packing cup may be used in connection with other types of pumps than those for pumping oil.

Having thus described this form of my in- vention, what I claim and desire to protect by Letters Patent is:

1. A packing device for pump rods, comprising a body fabric consisting of a plurality of continuously or integrally connected layers of tubular braided fabric, doubled upon itself.

2. A packing device for pump rods, comprising a body portion made of tubular braided fabric which is doubled upon itself, forming a braided or selvage edge at one end, the doubled portions being secured together to form a unitary packing ring.

3. A packing device for pump rods, comprising a body portion made of tubular braided fabric doubled upon itself, said device being impregnated with a suitable homogeneous compound and formed with an internal retaining flange at one end.

4. A packing device for pump rods, comprising a body portion made of braided fabric doubled upon itself, forming a selvage edge, said device being impregnated with a suitable homogeneous compound and formed with an internal retaining flange at the end opposite the selvage edge.

5. A packing device for pump rods, comprising a braided fabric having its threads extending helically, said fabric being doubled upon itself to form a woven edge, said doubled portions being stitched together, and said fabric being impregnated with a suitable compound and molded into shape with an inturned retaining flange at the edge opposite said woven edge.

Signed this 17th day of December, 1912.

HENRY Z. COBB.

Witnesses:
J. W. DUDGEON,
E. L. STICKNEY.